US012775966B2

(12) United States Patent
Platz et al.

(10) Patent No.: US 12,775,966 B2
(45) Date of Patent: Oct. 27, 2026

(54) DYNAMIC REALLOCATION OF SUBSCRIBERS TO DATA PLANS TO MINIMIZE TOTAL COST IN A CELLULAR TELECOMMUNICATIONS NETWORK

(71) Applicant: Boost SubscriberCo L.L.C., Englewood, CO (US)

(72) Inventors: William Platz, Parker, CO (US); Derek Schreiner, Denver, CO (US); Christine Chu, Davis, CO (US); Madhukar Pulluru, Foster City, CA (US); Qi Chu, Foster City, CA (US); Kalleri Faizel Rehiman, Fremont, CA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 13 days.

(21) Appl. No.: 18/949,620

(22) Filed: Nov. 15, 2024

(65) Prior Publication Data

US 2025/0278765 A1 Sep. 4, 2025

Related U.S. Application Data

(60) Provisional application No. 63/560,881, filed on Mar. 4, 2024.

(51) Int. Cl.
*G06Q 30/0283* (2023.01)
*G06Q 30/04* (2012.01)
*G06Q 50/50* (2024.01)

(52) U.S. Cl.
CPC ......... *G06Q 30/0283* (2013.01); *G06Q 30/04* (2013.01); *G06Q 50/50* (2024.01)

(58) Field of Classification Search
CPC ........... G06Q 30/0629; G06Q 30/0283; G06Q 50/50; G06Q 30/04

(Continued)

(56) References Cited

U.S. PATENT DOCUMENTS 9,887,895 B2 * 2/2018 Zalmanovitch ....... H04M 15/84
12,175,518 B2 * 12/2024 Kim .................. G06Q 30/0631

(Continued)

FOREIGN PATENT DOCUMENTS

WO WO-2021067440 A1 * 4/2021 ............ H04M 15/58
WO WO-2024155216 A1 * 7/2024 ............ G06N 20/00

OTHER PUBLICATIONS

"Use Case: Volume-based Data Plans", Mar. 5, 2020, cisco.com, 7 pages (Year: 2020).*

*Primary Examiner* — Shannon S Campbell
*Assistant Examiner* — Freda A Nelson
(74) *Attorney, Agent, or Firm* — Jeremiah J. Baunach

(57) ABSTRACT

Described herein are methods and systems for enabling retail subscribers to dynamically reallocate their individual subscriptions to different retail data plans in a billing cycle. In one embodiment, a plan grid and a corresponding cost grid for each subscriber are generated prior to the start of a billing cycle based on predicted daily data usage over the billing cycle. Then, on each day of the remaining days in the billing cycle, the plan grid and the cost grid for each subscriber are reconstructed based on actual data usage of each individual subscriber as well as for all subscribers included or eligible to be included in a family pooled plan with the subscriber. On any day of the billing cycle, there may be some reconstructed plan grids that include a cost-reduction time window that can reduce the total predicted cost of some subscribers. These subscribers can then be reallocated to a retail data plan associated with that cost-reduction time window.

20 Claims, 8 Drawing Sheets

(58) Field of Classification Search
USPC .................................................. 705/7.35, 400
See application file for complete search history.

(56) References Cited

U.S. PATENT DOCUMENTS

| | | | | |
|---|---|---|---|---|
| 2013/0171959 | A1* | 7/2013 | Ahluwalia ...... | H04W 36/00222 455/405 |
| 2014/0087688 | A1* | 3/2014 | Chiu ..................... | H04M 15/59 455/406 |
| 2014/0179266 | A1* | 6/2014 | Schultz ............... | H04M 15/852 455/406 |
| 2015/0065085 | A1* | 3/2015 | Sheikh Naziruddin ...................... | H04M 15/7652 455/406 |
| 2015/0242783 | A1* | 8/2015 | Sasaki .............. | G06Q 10/06314 705/7.24 |
| 2023/0087930 | A1* | 3/2023 | Schrenkel ............ | G06Q 20/145 705/7.31 |
| 2024/0405548 | A1* | 12/2024 | Mimaroglu ............ | G06Q 50/06 |
| 2025/0094156 | A1* | 3/2025 | Ji .............................. | G06F 8/65 |

* cited by examiner

DYNAMIC REALLOCATION OF SUBSCRIBERS TO DATA PLANS TO MINIMIZE TOTAL COST IN A CELLULAR TELECOMMUNICATIONS NETWORK

TECHNICAL FIELD

The present disclosure relates generally to cellular telecommunications networks and, more particularly, to dynamically reallocating subscribers of a cellular telecommunications network to different data plans.

BRIEF SUMMARY

Wireless networks have become ubiquitous in today's society, providing users with seamless communication and data access. A key challenge that arises in the wireless communication domain pertains to the efficient and cost-effective management of subscriber data plans for retail wireless subscribers.

Consider, for instance, a setting where a subscriber can have a retail wireless subscription with a wireless service provider based on two different plans: a metered plan and a pooled plan. The metered plan charges the individual subscriber based on the subscriber's usage, with rates applied to each byte or unit of data consumed by that subscriber. On the other hand, the pooled plan offers a collective volume of data (e.g., for a family of subscribers on a family plan), which can be distributed among the subscriber and their family member subscribers without distinction of individual data usage.

A challenge arises when the subscribers included in a family are locked into a particular plan for an entire billing cycle, preventing mid-cycle adjustments based on usage or needs. Such rigidity can lead to significant inefficiencies. For instance, if a substantial portion of family member subscribers have high data usage on the individual metered plan, while the pooled plan's collective data remains underutilized, the family members may end up facing higher total costs as a family. Similarly, if the pooled plan's collective data is exhausted early in the billing cycle, overage charges may be incurred for the rest of the billing cycle for usage by any member of the family if they are locked in the pooled plan for that billing cycle due to going over the collective data limit, reflecting inefficient data plan management and allocation.

In another example, a first wireless network (Network A) has a plurality of subscribers. While these subscribers are associated with Network A in terms of subscription life cycle management, they access data and services using the physical infrastructure of a second network (Network B). Network A can enter an agreement with Network B to lease data in two distinct wholesale plans: a metered plan and a pooled plan. The metered plan charges based on individual subscriber usage, with rates applied to each byte or unit of data consumed. On the other hand, the pooled plan offers a collective volume of data, which can be distributed among various subscribers without distinction of individual data usage.

In the above example, a challenge also arises when Network A's subscribers are locked into a plan for an entire billing cycle, preventing mid-cycle adjustments based on usage or needs. Such rigidity can lead to significant inefficiencies. For instance, if a substantial portion of subscribers have high data usage on the metered plan, while the pooled plan's collective data remains underutilized, Network A may end up facing higher costs. Similarly, if the pooled plan's collective data is exhausted early in the billing cycle, Network A may receive a higher invoice from Network B, reflecting inefficient data plan management and allocation.

In light of these challenges, there is a need for a system or method that optimizes the allocation of subscribers to data plans, ensuring efficient utilization while minimizing costs. To address the above need, this disclosure describes systems, methods, and media for dynamically reallocating family member subscribers to individual metered plan and a family pooled plan in a billing cycle, and in another example dynamically reallocating subscribers of a leasing wireless network to different wholesale data plans in a billing cycle. In one embodiment, a plan grid and a corresponding cost grid for each subscriber are generated prior to the start of a billing cycle based on predicted daily data usage for the billing cycle and each subscriber is allocated to a data plan based on their respective plan grids. Starting from the $2^{nd}$ day of the billing cycle, the plan grid and the cost grid for each subscriber are reconstructed each day for the remaining days in the billing cycle based on actual data usage of each individual subscriber as well as total data usage of all subscribers on an immediately preceding day. On any day of the billing cycle, at least one reconstructed plan grid includes a cost-reduction time window that can reduce the total predicted cost of the subscriber. The subscriber can then be reallocated to a data plan associated with that cost-reduction time window.

In an embodiment, the system can be a multi-node cloud system, where the operations for optimizing the allocation of subscribers to data plans can be distributed across multiple processing nodes to increase the system's scalability, fault tolerance, and performance in terms of processing speed of the system. Further, all the plan grids and cost grids can be loaded into a distributed shared memory (DSM). The DSM can be accessed by multiple processing nodes. The introduction of DSM enhances the system's scalability since it allows more processing nodes to be added as more processing power is needed. As the system expands, it offers increased memory resources to the applications, boosting overall performance. Further, the DSM facilitates the efficient use of memory resources spread across different machines. If a node is grappling with high memory consumption, it has the capability to tap into the unused memory of other nodes, enhancing the adaptability of the cloud-based computing system.

According to other embodiments, the method can be implemented by a system and/or a computer readable storage medium as described herein.

As shown above and in more detail throughout the disclosure, various embodiments of the disclosure provide technical improvements over existing systems for resource allocations to digital channels. These and other features and advantages of the disclosure will become more readily apparent in view of the embodiments described herein and illustrated in this specification.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments can be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments can be methods, systems, media, or devices. Accordingly, the various embodiments can be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
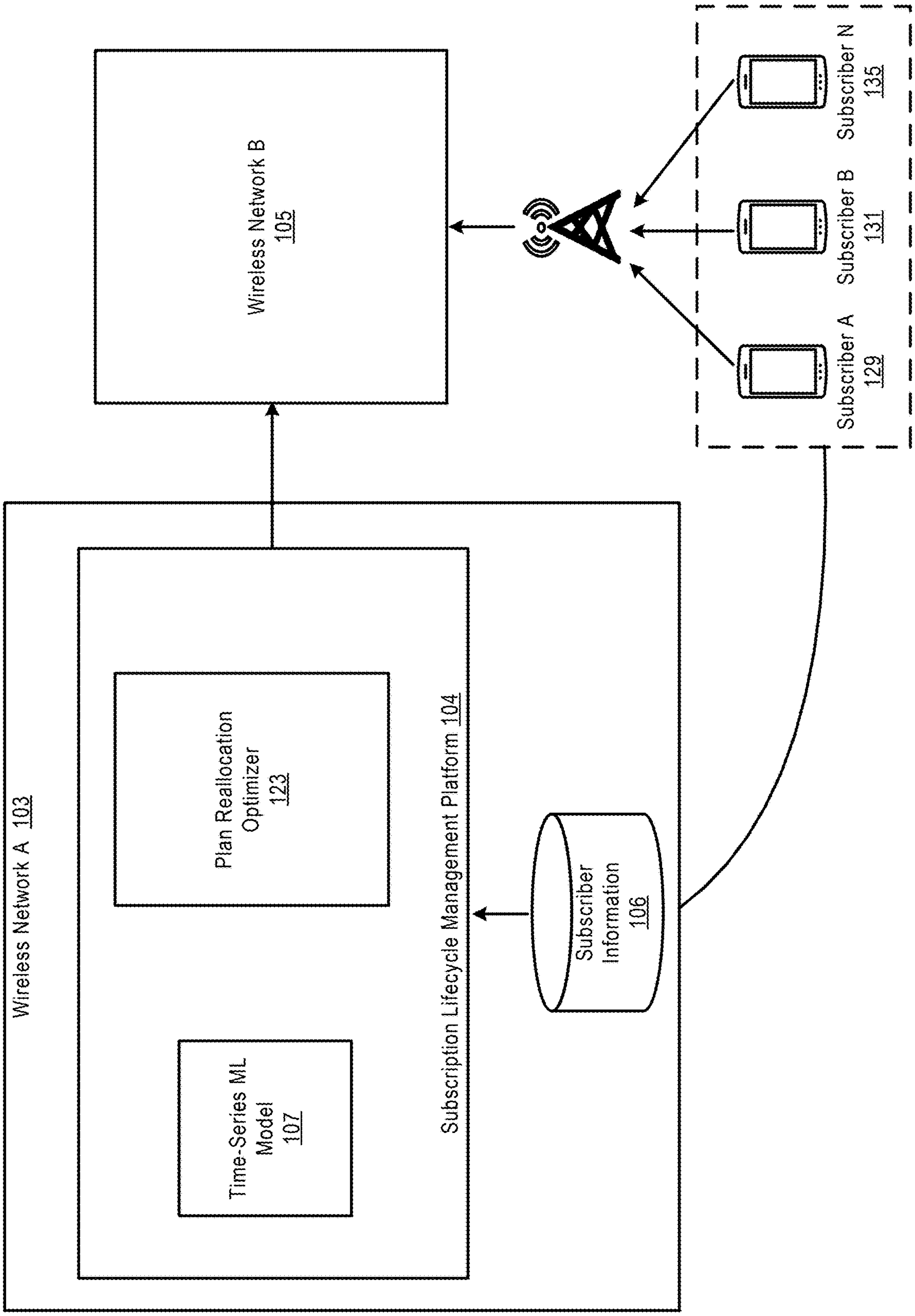
FIG. 1 is a block diagram illustrating an example of a telecommunications network in which embodiments of the disclosure may be implemented.

FIG. 1 is a block diagram illustrating an example of a telecommunications network in which embodiments of the disclosure may be implemented.

In an example embodiment, end subscribers 129, 131, and 135 may be members of a family and subscribe to Network A under several different retail wireless plans, including a metered plan for each subscriber and a pooled plan for a group of subscribers (e.g., a family plan). Wireless network A 103 is the primary service provider for end subscribers 129, 131, and 135, handling their subscription life cycle management. The metered data plan charges each subscriber based on individual subscriber usage, with rates applied to each byte or unit of data consumed. Conversely, the pooled data (e.g., in a family plan) aggregates the data quota of each subscriber participant together to be shared among all subscriber participants in the family.

As an example, for each subscriber that stays on the metered plan throughout a billing cycle, the subscriber (e.g., subscriber B) pays a base cost of $20. If the subscriber (e.g., subscriber B) uses 40 GB during the billing cycle, the subscriber needs to pay the per unit of data rate for 40 GB in addition to paying the base cost.

As another example, for each subscriber in the pooled plan (e.g., in a family plan), the main subscriber (e.g., subscriber A) responsible for paying for the family plan pays $25 for a data quota of 35 GB for each member of the family plan. If subscriber A uses 50 GB and subscriber B uses 10 GB during the billing cycle, the subscriber responsible for paying for the family plan does not need to pay for the overage of 15 GB incurred by subscriber A, because the unused allowance of subscriber B can cover the overage for that billing cycle.

In the present example embodiment, each subscriber of Network A is required to declare (sign up for, subscribe to or commit to) a particular plan. Plan declarations refer to a communication or documentation specifying the type of data plan that is being utilized or allocated to that particular subscriber of Network A. In the present embodiment, each subscriber can declare a different plan multiples times during each billing cycle, which means that the subscriber may switch back and forth between the metered plan and the pooled plan (e.g., family plan) during the billing cycle after the subscriber initially declares a plan at the beginning of the billing cycle.

A subscription life cycle management platform 104 can be provided in the Network A to handle subscriber onboarding, billing, customer service, and other related activities. Further, the subscription life cycle management platform 104 can include algorithms, machine learning models, and/or deep learning models to analyze subscriber data and usage patterns to provide to each subscriber and/or enable each subscriber to dynamically change (or automatically change on the subscriber's behalf) data plan allocations of the subscriber to minimize the invoice to each subscriber from Network A for each billing cycle. It should be noted that subscription life cycle management platform 104 is presented here merely as an illustrative example. Other components or servers, whether situated within or external to wireless network A 103, are equally capable of performing functions pertinent to invoice minimization.

In this embodiment, the subscription life cycle management platform 104 includes a machine learning model 107, which has been trained to predict daily data usages of each subscriber in a predetermined window in the future, e.g., the next 30 days. In one embodiment, machine learning model 107 can be N-Beats model, or Neural Basis Expansion Analysis for Time Series Forecasting. The input data for the subscribers can be retrieved from a subscriber information database 106, which can store subscription details of the subscribers, including billing details, transactions, and unpaid dues, retail data plans service packages, and any additional features they've subscribed to. The subscriber information database stores information that can provide a granular insight into each subscriber's preferences and usage patterns.

In addition, the subscription life cycle management platform 104 can include a plan reallocation optimizer 123 configured to construct plan grids and cost grids for the first day of the billing cycle for all the subscribers of Network A prior to the start of a billing cycle based on predicted daily data usage in the billing cycle, and then dynamically reconstruct the plan grids for those subscribers and the costs in each day of the remaining days of the billing cycle based on actual daily data usage of each individual subscriber as well as all the subscribers on or eligible for a particular family plan on an immediately preceding day within the billing cycle. Further, the plan reallocation optimizer 123 can be configured to determine whether to reallocate a subscriber to a different data plan in each of the remaining days of the billing cycle based on the reconstructed plan grid and the constructed cost grid for that day.

In a different example embodiment, wireless network A 103 is the primary service provider for end subscribers 129, 131, and 135, handling their subscription life cycle management. However, wireless network A 103 does not own the physical data infrastructure that the subscribers use. Instead, the physical infrastructure is owned by wireless network B 105. Wireless network A 103 leases data from wireless network B 105. Therefore, in this figure, wireless network A 103 is the leasing network and wireless network B 105 is the leased network.

The leasing network may lease data from the leased network under several wholesale plans, including a metered plan and a pooled plan. The metered data plan charges based on individual subscriber usage, with rates applied to each byte or unit of data consumed. Conversely, the pooled data aggregates the data quota of each subscriber participant together to be shared among all subscriber participants.

As an illustrative example, for each subscriber that stays in the metered plan throughout a billing cycle, the leasing network pays a base cost of $20. If the subscriber uses 40 GB during the billing cycle, the leasing network needs to pay the per unit of data rate for 40 GB in addition to paying the base cost.

As another example, for each subscriber in the pooled plan, the leasing network pays $25 for a data quota of 35 GB. If subscriber A uses 50 GB and subscriber B uses 10 GB during the billing cycle, the leasing network does not need to pay for the overage of 15 GB incurred by subscriber A, because the unused allowance of subscriber B can cover the overage for that billing cycle.

In the present example embodiment, the leasing network is required to declare plans for each subscriber of the leasing network. Plan declarations refer to a communication or documentation specifying the type of data plan that is being utilized or allocated to each subscriber of the leasing network. The leasing network can declare plans for each subscriber multiples times during each billing cycle, which means that the leasing network may switch a subscriber back and forth between the metered plan and the pooled plan during the billing cycle after the leasing network initially declares a plan for that subscriber at the beginning of the billing cycle. Also, in some embodiments, a hybrid metered and pooled plan may be selected that is based on a tiered usage system in which the leasing network is charged based on metered usage for each individual subscriber up to a total amount of usage for each individual subscriber or total collective usage of all subscribers. When usage surpasses this threshold to another tier the leasing network is charged is charged based on pooled data usage thereafter.

Also, in another embodiment, the leasing network is charged based on pooled data usage for each individual subscriber up to a total amount of usage for each individual subscriber or total collective usage of all subscribers. When usage surpasses this threshold to another tier the leasing network is charged based on metered usage for each individual subscriber thereafter.

Additionally, the leasing network may instead select to have particular subscribers be pooled together in a subgroup with other subscribers for which the leasing network will be charged based on pooled data usage for each subgroup, while the leasing network will be charged based on individual metered usage for all other subscribers.

In the present example embodiment, even when a wholesale arrangement is in place between the leasing network and the leased network, the leased network bills the leasing network based on the cost associated with each individual subscriber. Consequently, it would be advantageous for the leasing network to reduce the cost per subscriber.

In the present example embodiment, subscription life cycle management platform 104 can be provided in the leasing network to handle subscriber onboarding, billing, customer service, and other related activities. Further, the subscription life cycle management platform 104 can include algorithms, machine learning models, and/or deep learning models to analyze subscriber data and usage patterns to dynamically change data plan allocations of the subscribers to minimize the invoice from the leased network for each billing cycle. It should be noted that subscription life cycle management platform 104 is presented here merely as an illustrative example. Other components or servers, whether situated within or external to wireless network A 103, are equally capable of performing functions pertinent to invoice minimization.

In this embodiment, the subscription life cycle management platform 104 includes a machine learning model 107, which has been trained to predict daily data usages of each subscriber in a predetermined window in the future, e.g., the next 30 days. In one embodiment, machine learning model 107 can be N-Beats model, or Neural Basis Expansion Analysis for Time Series Forecasting. The input data for the subscribers can be retrieved from a subscriber information database 106, which can store subscription details of the subscribers, including billing details, transactions, and unpaid dues, retail data plans service packages, and any additional features they've subscribed to. The subscriber information database stores information that can provide a granular insight into each subscriber's preferences and usage patterns.

In addition, the subscription life cycle management platform 104 can include a plan reallocation optimizer 123 configured to construct plan grids and cost grids for the first day of the billing cycle for all the subscribers of the leasing network prior to the start of a billing cycle based on predicted daily data usage in the billing cycle, and then dynamically reconstruct the plan grids and the costs in each day of the remaining days of the billing cycle based on actual daily data usage of each individual subscriber as well as all the subscribers of the leasing network on an immediately preceding day within the billing cycle. Further, the plan reallocation optimizer 123 can be configured to determine whether to reallocate a subscriber to a different data plan (e.g., metered, pooled or hybrid) in each of the remaining days of the billing cycle based on the reconstructed plan grid and the constructed cost grid for that day.

Figure 2:
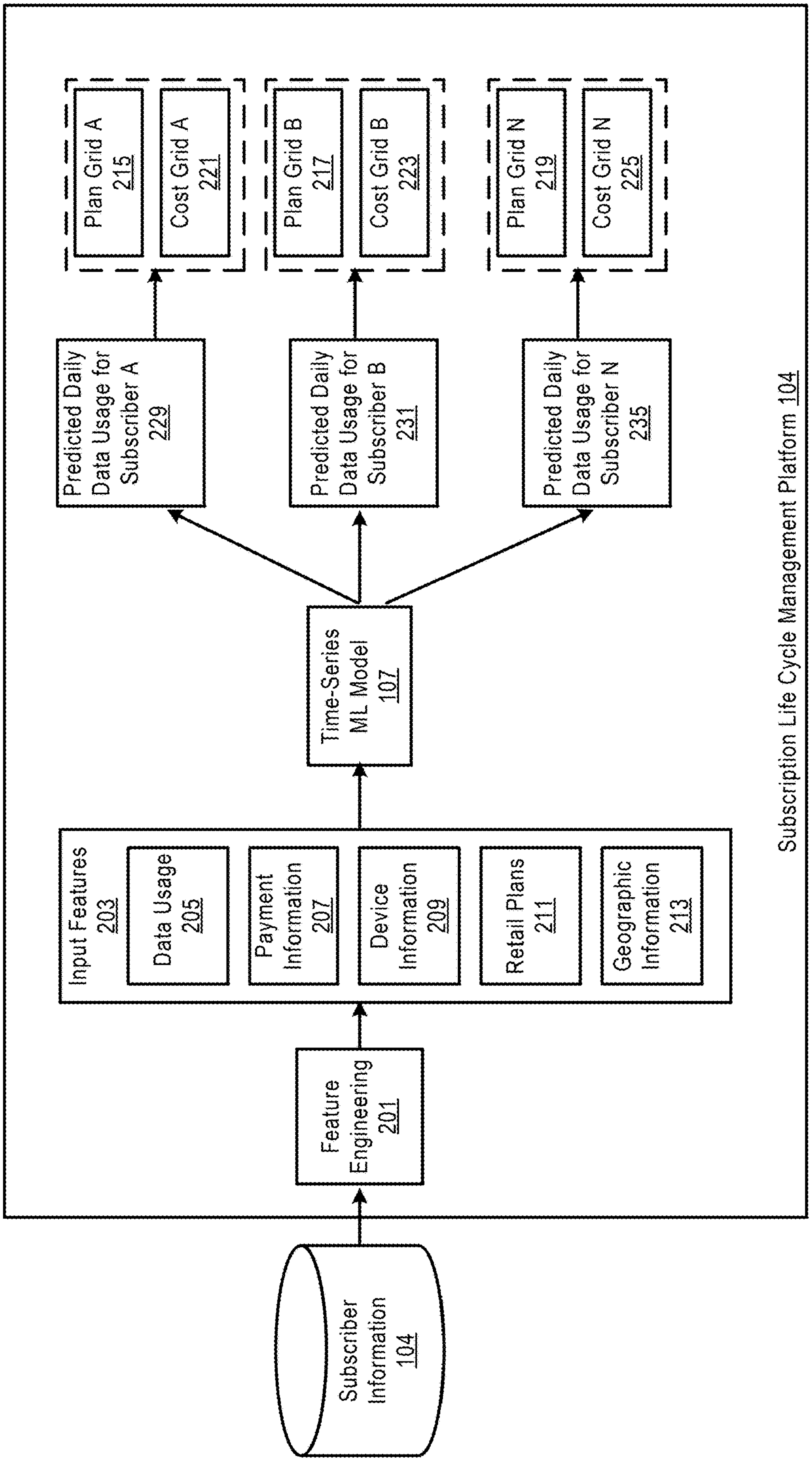
FIG. 2 is a flow diagram that further illustrates the time-series machine learning model 107 according to an embodiment of the invention.

FIG. 2 is a flow diagram that further illustrates the time-series machine learning model 107 according to an embodiment of the invention. As shown, a feature engineering module 201 can prepare input data for the machine learning model 107 by selecting, transforming, or creating input features 203.

In an embodiment, the input features 203 include several features 205-213 for each subscriber. The input features 203 can be extracted from historical records during a past period (e.g., the last 2 years). The data usage 205 can be daily usage in terms of MB, GB, or TB, the manner the data was consumed (streaming video or merely browsing the internet), or hours when the data was consumed. The payment information 207 can include transaction records indicating regular and timely payments or lack thereof. The device information 209 can include the type and capability of each subscriber (a device in this disclosure). The retail plans 211 can indicate whether a subscriber is on an unlimited plan or a limited plan. The geographic information 213 can include whether the subscriber's travel patterns.

Based on the input features 201, the time-series machine learning model 107 can be run before the beginning of a billing cycle to predict data usage 229-235 for each day of the billing cycle for each of the subscribers 129-135. Based on the predicted daily data usage of each subscriber for the billing cycle, the subscription life cycle management platform 104 can create a plan grid and a cost grid for each subscriber for the billing cycle.

As shown in the figure, plan grids 215-219 and cost grids 221-225 are created respectively for the subscribers 129-135. A billing cycle can completely overlap with a calendar month or start at any day within a calendar month and ends on the day of the next calendar month. In the embodiment, a billing cycle completely overlapping with a calendar month is used as an illustrative example.

Although the figure shows that the plan grid and the cost grid for each subscriber are created based on the predicted daily data usage for that subscriber, the plan grid and the cost grid can also be created based on predicted daily data usages of all subscribers.

Each of the plan grids 215-219 includes different time windows that cover each and every combination of days in the calendar month. Each day in any of the time window can include a plan indicator to indicate which wholesale plan (e.g., a metered plan or a pooled plan) that the subscriber is allocated to. These plan allocations are predicted based on the predicted daily data usage mentioned earlier and is subject to change if the subscriber is reallocated to a different data plan than its initially assigned plan.

Each of the cost grids 221-225 corresponds to one of the plan grids 215-219 and includes an equal number of cells as its corresponding plan grid. Each cell can include a value indicating a predicted cost for the subscriber if the subscriber stays in a particular plan throughout a time window from the beginning of the billing cycle to the date corresponding to that cell.

After the plan grids 215-219 and the cost grids 221-225 are created, they can be reconstructed on each day of the billing cycle starting from day 2, when actual data usage for the subscribers becomes available for the first day of the billing cycle. It should be noted that the cell values in each reconstructed cost grid may be impacted by cost grids for other subscribers.

Figure 3A:
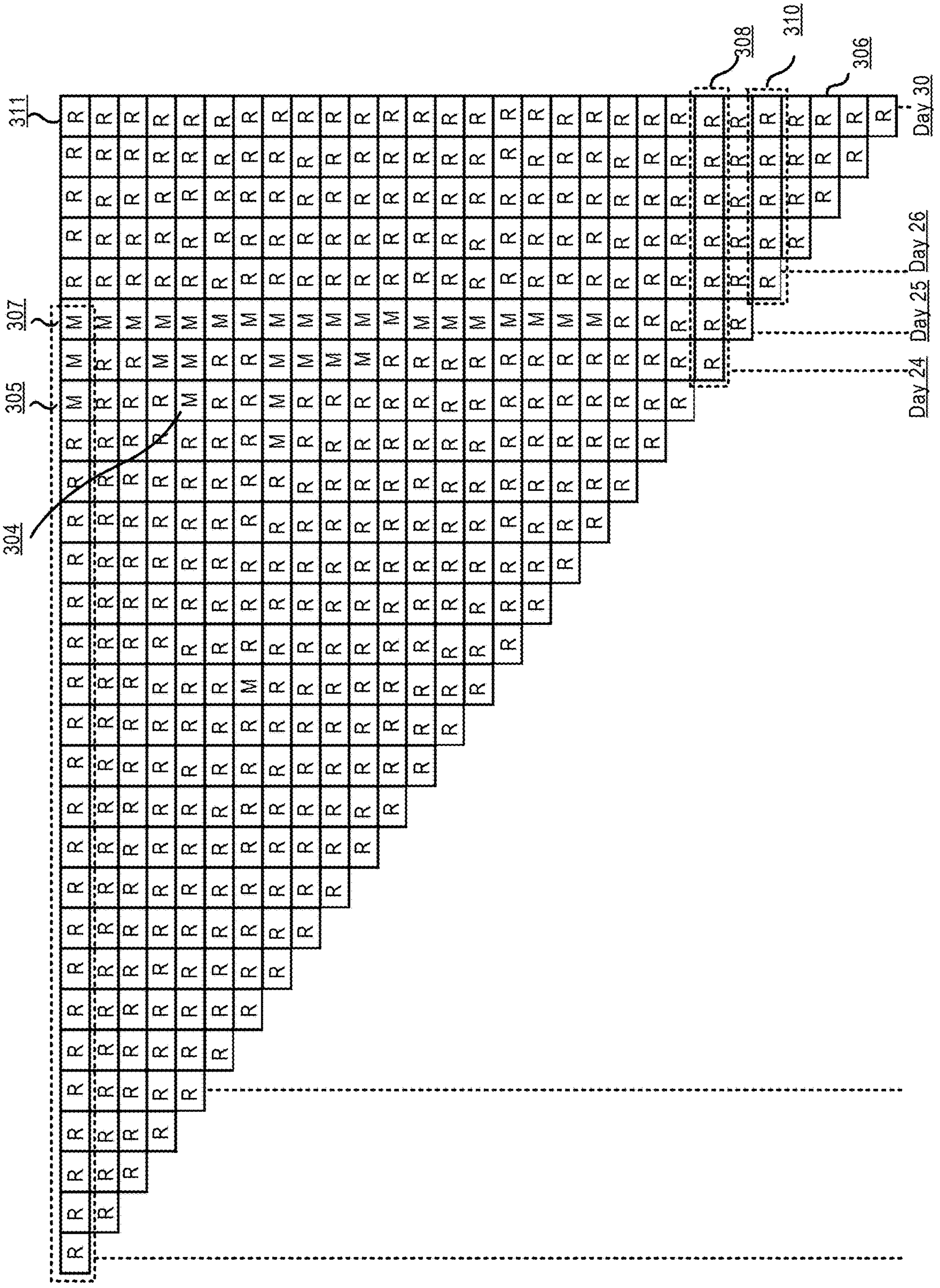
FIGS. 3A and 3B illustrate an example of a plan grid and an example of the corresponding cost grid according to an embodiment of the disclosure.
Figure 3B:
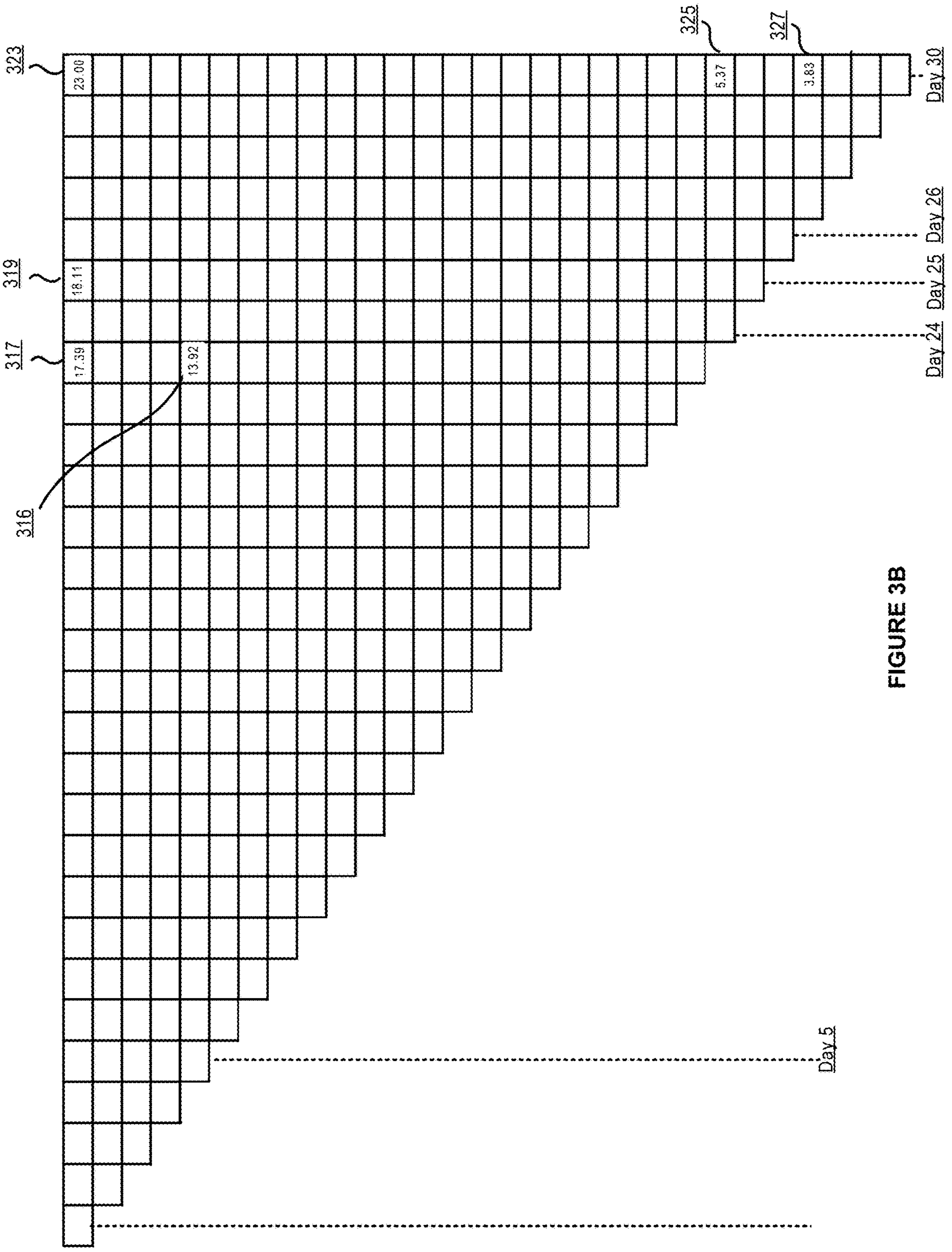

FIGS. 3A and 3B illustrate an example of a plan grid and an example of the corresponding cost grid according to an embodiment of the disclosure. The plan grid in FIG. 3A is for a calendar month with 30 days and is generated before the beginning of the calendar month for a specific subscriber based on the predicted data usage for each day of the calendar month. As described above, the predicted daily data usage is based on the historical data usage patterns of the subscriber in the past (e.g., the last 2 years) and a number of features (e.g., the type of device used by the subscriber).

The plan grid in FIG. 3A is a descending staircase grid, with the first row consisting of 30 cells, the second row consisting of 29 cells, the third row consisting of 28 cells, and so on. Within the plan grid, each cell contains a letter that signifies the type of plan that the subscriber is allocated to, with the letter "R" representing the pooled plan and the letter "M" representing the metered plan. However, the letter in a cell indicates not just a plan allocation of the subscriber for that particular day corresponding to the cell but also plan allocations for a time window from the beginning of the row to and that particular date.

For example, the cell 305 corresponds to day 23 of the calendar month and is situated row 1. Thus, the letter "M" in the cell 305 indicates a scenario in which the subscriber is allocated to the metered plan on day 1 of the calendar month and stays in the plan until day 23. As another example, the cell 307 corresponds to day 25 of the calendar month and is situated row 1. Thus, the letter "M" in the cell 305 indicates a scenario in which the subscriber is allocated to the metered plan on day 1 of the calendar month and stays in the plan until day 25. As a further example, the cell 306 corresponds to day 30 of the calendar month and is situated in the row 27 (the third row from the bottom row, which is row 30). Thus, the letter "R" in the cell 306 indicates a scenario in which the subscriber is allocated to the pooled plan from the beginning of the row (i.e., day 27) and stays in the plan until day 30.

The plan grid in FIG. 3A can be generated by the time-series machine learning model 107 and represents the optimal plan allocations for that subscriber based on the subscriber's historical data usage patterns and one or more other features. This is made evident by the corresponding cost grid in FIG. 3B.

In one embodiment, the cost grid in FIG. 3B is also a descending staircase grid and includes the same number of cells as the plan grid in FIG. 3A. The cells in the cost grid and the cells in the plan grid has a one-to-one relationship and each cell in the plan grid has a matching cell in the exact same location in the other grid.

In one embodiment, each cell in the cost grid contains a value indicating a predicted cost. However, for the clarity and simplicity in description, the values in only certain cells are shown in the cost grid.

As shown in the cost grid in 3B, the cell 319 corresponds to day 25 of the calendar month and has a value of $18.11, which is a dollar amount representing a predicted cost for the subscriber if the subscriber stays in the metered plan from day 1 of the calendar month to day 25. This is because the cell 319 in the cost grid corresponds to the cell 307 in the plan grid and contains the letter "M" indicating a scenario in which the subscriber is allocated to the metered plan from the beginning of the row (i.e., day 1) and stays in the plan until day 25. Similarly, the predicted cost for the subscriber if the subscriber stays in the metered plan throughout the time window starting from day 5 to day 23 is $13.92, as indicated by the cell 316, because the cell 316 corresponds to the cell 304 in the plan grid that includes the letter "M". However, the predicted cost for the subscriber would be $23.00 if the subscriber stays in the pooled plan throughout the calendar month from day 1 to day 30, as indicated by the cell 323, which corresponds to the cell 311 in the plan grid that includes the letter "R".

Therefore, based on the predicted plan grid and the predicted cost grid that are generated prior to the start of the calendar month, the cost of the subscriber can be reduced by keeping the subscriber in the metered plan from day 1 to day 25 and then reallocating the subscriber to the pooled plan and keeping it in the new plan from day 26 to day 30. The cost for the subscriber during the first 25 days of the calendar month when it is in the metered plan would be $18.11 as indicated by the cell 319 in the cost grid, and the cost for the subscriber during the last 5 days of the calendar month would be $3.83 as indicate by the cell 327. Therefore, the predicted cost for the subscriber with the plan reallocation on day 26 would be 18.11+3.83=$21.94, while the total predicted cost for the subscriber if the subscriber stays in the pooled plan throughout the whole calendar month would $23.00 as indicated by the cell 323. Thus, the plan reallocation on day 26 saves $1.06 ($23–$21.94).

There can be multiple cost-reduction opportunities on the plan grid. As an example of another cost-reduction opportunity, the subscriber can stay in the metered plan from day 1 to day 23 and then switches to the pooled plan on day 24 and stay in the new plan until day 30. With such plan allocations, the total predicted cost for the subscriber would be the sum of $17.39 in the cell 317 and $5.37 in the cell 325. Compared to the total predicted cost of $23.00 in the cell 323 if the subscriber would stay in the pooled plan throughout the calendar month, this opportunity represents a cost reduction of $23–($17.39+$5.37)=$0.24. This cost reduction resulting from the plan switch on day 24 is less than the cost reduction resulting from the plan switch on day 26. Accordingly, the subscription life cycle management platform 104 may reallocate the subscriber from the metered plan to the pooled plan on day 26 rather than on day 24.

Thus, the plan grid and the cost grid together can project multiple time windows. Each time window represents a duration where the subscriber can stay in either the metered plan or the pooled plan and is associated with a predicted cost for the subscriber for that time window. Through searching for a combination of one or more time windows with the smallest total predicted cost, the subscription life cycle management platform 104 can reduce the cost of the subscriber during the billing cycle.

It should be noted that the cost grid and the plan grid are reconstructed each day during the calendar month based on actual data usage of each individual subscriber as well as all subscribers on a previous day, regardless of whether a subscriber is in a pooled plan or a metered plan. Therefore, a newly generated plan grid may have different cost-reduction time windows for the subscriber. On each day of a billing cycle, the subscription life cycle management platform 104 can determine whether to reallocate the subscriber to a different plan based on the newly generated cost grids and the newly generated plan grids for all subscribers of the leasing wireless network.

By the end of the billing cycle, the subscription life cycle management platform 104 can have plan allocations throughout the billing cycle for all subscribers. These allocations can represent the optimal plan allocations for each subscriber in terms of cost.

Figure 4:
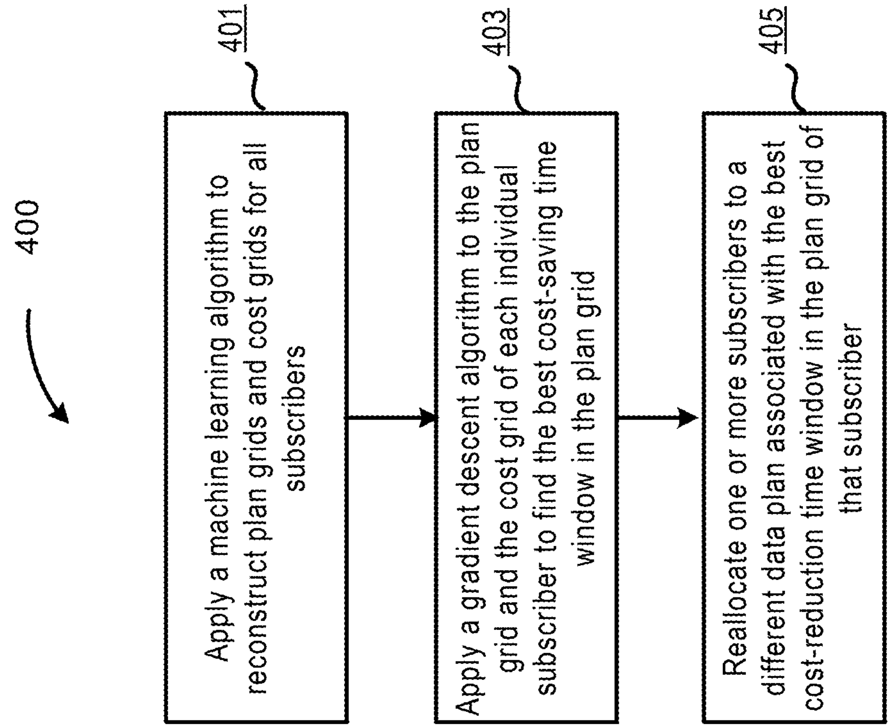
FIG. 4 is a block diagram illustrating a process of reallocating a subscriber to a different data plan according to an embodiment of the invention.

FIG. 4 is a block diagram illustrating a process 400 of reallocating a subscriber to a different data plan according to an embodiment of the invention. The process 400 can be performed by a processing logic that includes software, hardware, or a combination thereof. The process 400 can be performed by a plurality of processing nodes of a multi-node cloud structure. Bach processing node is tasked with performing a portion of the operations of the process, thus increasing the system's scalability, fault tolerance, and performance in terms of processing speed of the system. Additionally, the cloud-based system equipped with a distributed shared memory (DSM) architecture, which enhances the system's scalability and flexibility because the DSM allows more processing nodes to be added as more processing power is needed and/or also allows a node with high memory consumption to tap into the unused memory of other nodes.

Referring to the process 400, at step 401, the processing logic applies a machine learning to reconstruct plan grids and cost grids for all the subscribers of a leasing network regardless of their plan type. This action can be performed daily throughout the billing cycle excluding the first day. While reconstruction, the processing logic considers actual data usage of all the subscribers from a previous day. The machine learning model, which is different from the one used to predict a subscriber's daily data usage described above, can be any of the following: logistic regression model, decision tree and random forests model, gradient boosting model, deep learning model, or a reinforce learning model.

At step 403, the processing logic applies a gradient descent algorithm to the reconstructed plan grid and reconstructed cost grid to find the best cost-reduction time windows on the plan grid. The best cost-reduction time window can reduce the total predicted cost the most throughout the billing cycle based on the reconstructed plan grid and the reconstructed cost grid for that day. This is because the plan grid and the cost grid are reconstructed daily throughout the billing cycle except the first day.

At step 405, the processing logic reallocates one or more subscribers to a different plan associated with the best cost-reduction time window.

Figure 5:
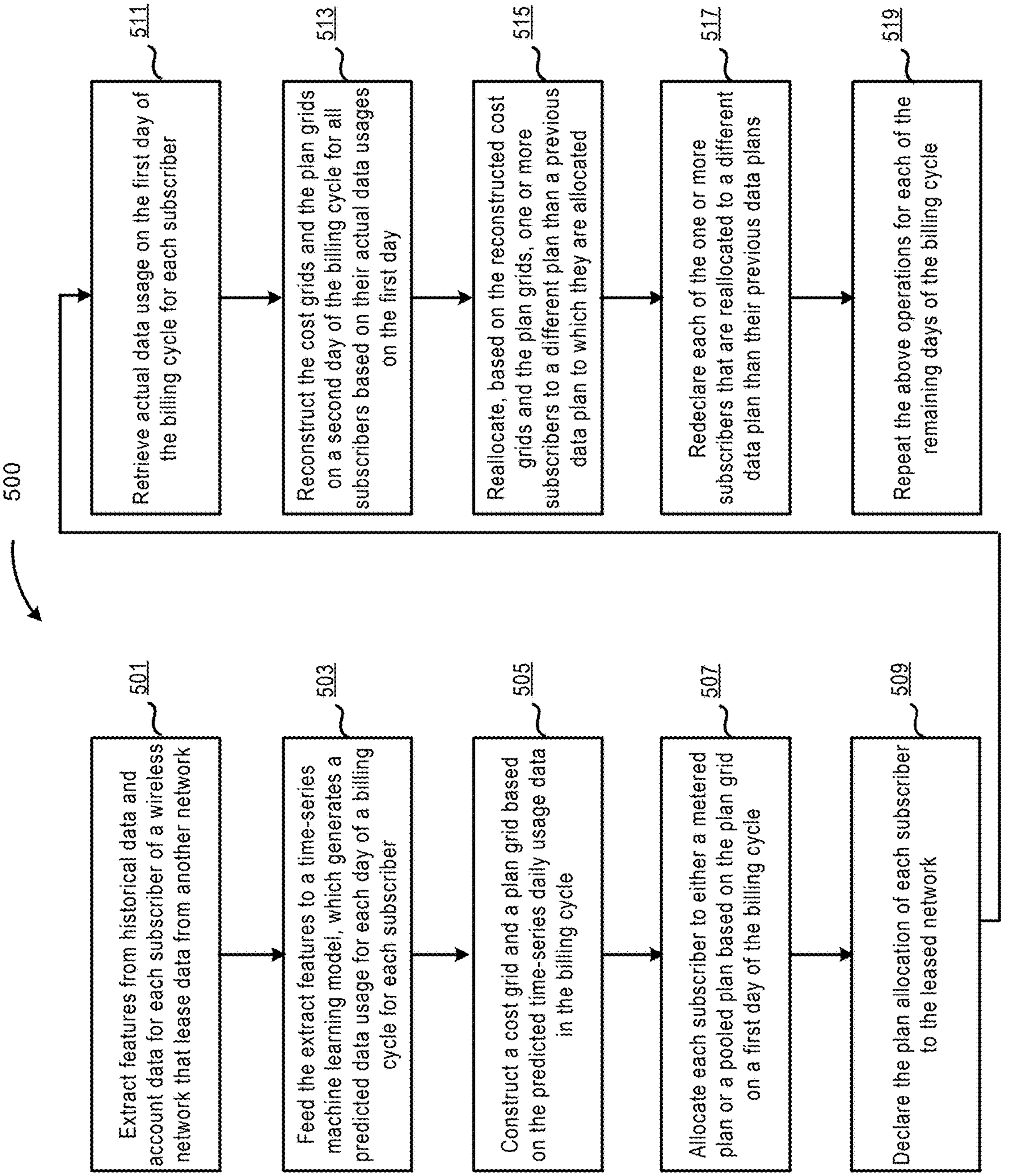
FIG. 5 is a block diagram illustrating a process of dynamically reallocating subscribers of a leasing wireless network according to an embodiment of the disclosure.

FIG. 5 is a block diagram illustrating a process 500 of dynamically reallocating subscribers of a leasing wireless network according to an embodiment of the disclosure. The process 500 can be performed by a processing logic that includes software, hardware, or a combination thereof. For example, all the steps can be performed by a subscription life cycle management platform in a leasing network.

At step 501, the processing logic extracts features using a feature engineering model from historical data and account data of all subscribers of a leasing network from a subscriber information database, which can be populated using data periodically (e.g., every day) transmitted from a leased network from which the leasing network leases data under a metered data plan and a pooled data plan. In one embodiment, the features can include a daily data usage of each subscriber over the last years or another time frame, the type of device each subscriber uses, and their geographic locations when consuming data, etc.

At step 503, the processing logic feeds the extracted features to a time-series machine learning model, which generates a predicted data usage for each day of a period of time in the future for each subscriber. The time-series machine learning model can be an N-Beats model that has been trained using data sets related to the subscribers of the leasing network and/or subscribers of other networks. The period of time can be a billing cycle that completely overlaps with a calendar month or starts from any day in the calendar month and ends on the same day of the next calendar month.

At step 505, the processing logic constructs a cost grid and a plan grid based on the predicted time-series daily usage data in the period of time in the future for each subscriber. Each cell of the plan grid contains an indicator indicating a plan allocation for the subscriber for different time windows within the period of time, and the cost grid contains corresponding cells indicating a predicted cost of the subscriber if it stays the indicated plan throughout the time window.

At step 507, the processing logic allocates each subscriber to either a metered plan or a pooled plan based on the plan grid on the first day of the billing cycle.

At step 509, the process logic declares each subscriber to the leased network, informing the leased network of the plan allocation of each subscriber. In one embodiment, the leasing network can send a request to the leased network's API endpoint to declare the plans. This request can contain details like plan duration, resources required, expected usage, etc. The leased network's API processes this request, verifies the availability of the requested resources, and then confirms or denies the plan declaration.

At step 511, the processing logic retrieves actual data usage on the first day of the billing cycle for each subscriber from the subscriber information database.

At step 513, the processing logic reconstructs the cost grids and the plan grids on a second day of the billing cycle for all subscribers based on their actual data usages on the first day. These updated grids contain predicted plan allocations and their associated costs.

At step 515, the processing logic reallocates, based on the reconstructed cost grids and the plan grids, one or more subscribers to a different plan than a previous data plan to which they are allocated.

At step 517, the processing logic redeclares each subscriber reallocated to a different plan from their previous one.

At step 519, the processing logic repeats the above operations for each of the remaining days of the billing cycle.

Figure 6:
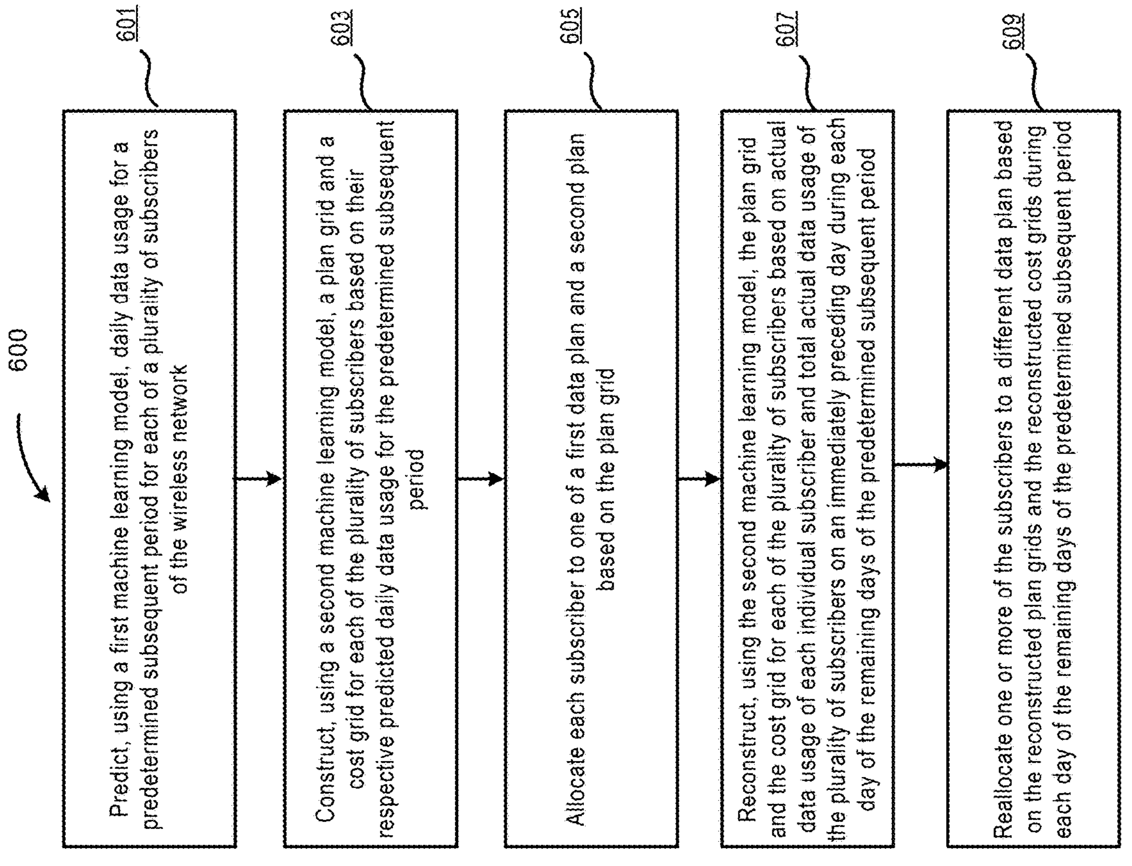
FIG. 6 is a block diagram illustrating a process 600 of reallocating subscribers of a leasing network to different data plans according to an embodiment of the disclosure.

FIG. 6 is a block diagram illustrating a process 600 of reallocating subscribers of a leasing network to different data plans according to an embodiment of the disclosure. The process 600 can be performed by a processing logic that includes software, hardware, or a combination thereof. For example, the process 600 can be performed by one or more software modules described in FIGS. 1 and 2.

At step 601, the processing logic predicts, using a first machine learning model, daily data usage for a predetermined subsequent period for each of a plurality of subscribers of the wireless network.

At step 603, the processing logic constructs, using a second machine learning model, a plan grid and a cost grid for each of the plurality of subscribers based on their respective predicted daily data usage for the predetermined subsequent period, wherein the cost grid for each subscriber includes values indicating predicted costs for that subscriber for different time windows within the predetermined subsequent period.

At step 605, the processing logic allocates each subscriber to one of a first data plan and a second plan based on the plan grid.

At step 607, the processing logic reconstructs, using the second machine learning model, the plan grid and the cost grid for each of the plurality of subscribers based on actual data usage of each individual subscriber and total actual data usage of the plurality of subscribers on an immediately preceding day during each day of the remaining days of the predetermined subsequent period.

At step 609, the processing logic reallocates one or more of the subscribers to a different data plan based on the reconstructed plan grids and the reconstructed cost grids during each day of the remaining days of the predetermined subsequent period.

Figure 7:
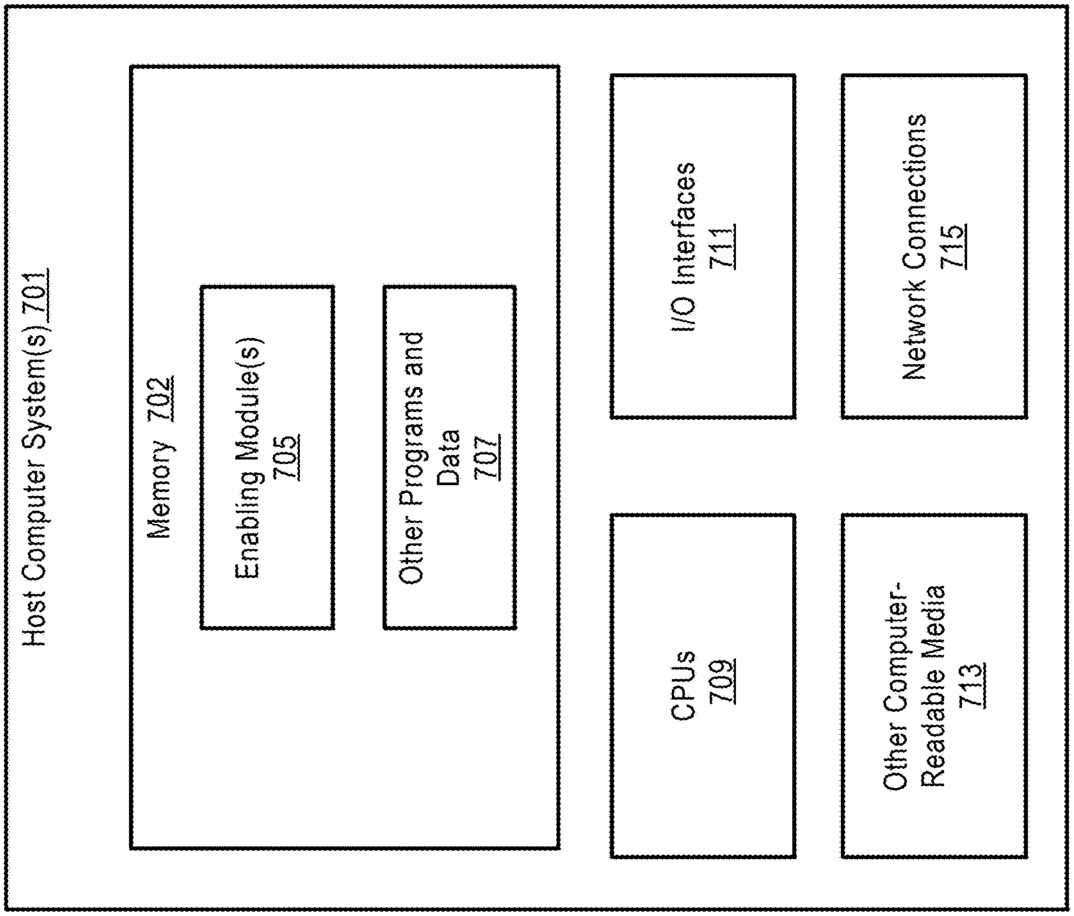
FIG. 7 shows a system diagram that describes an example implementation of a computing system(s) for implementing embodiments described herein.

FIG. 7 shows a system diagram that describes an example implementation of a computing system(s) for implementing embodiments described herein.

The functionality described herein for dynamically allocating subscribers to different plans for cost minimization in a wireless network can be implemented either on dedicated hardware, as a software instance running on dedicated hardware, or as a virtualized function instantiated on an appropriate platform, e.g., a cloud infrastructure. In some embodiments, such functionality can be completely software-based and designed as cloud-native, meaning that they are agnostic to the underlying cloud infrastructure, allowing higher deployment agility and flexibility. However, FIG. 7 illustrates an example of underlying hardware on which such software and functionality can be hosted and/or implemented.

In this embodiment, an example host computer system(s) 701 is used to represent one or more of those in various data centers, base stations and cell sites shown and/or described herein that are, or that host or implement the functions of: routers, components, microservices, nodes, node groups, control planes, clusters, virtual machines, network functions (NFs), intelligence layers, orchestrators and/or other aspects described herein, as applicable, for dynamically allocating subscribers to different plans for cost minimization in a wireless network. In some embodiments, one or more special-purpose computing systems can be used to implement the functionality described herein. Accordingly, various embodiments described herein can be implemented in software, hardware, firmware, or in some combination thereof. Host computer system(s) 701 can include memory 702, one or more central processing units (CPUs) 709, I/O interfaces 711, other computer-readable media 713, and network connections 715.

Memory 702 can include one or more various types of non-volatile (non-transitory) and/or volatile (transitory) storage technologies. Examples of memory 702 can include, but are not limited to, flash memory, hard disk drives, optical drives, solid-state drives, various types of random-access memory (RAM), various types of read-only memory (ROM), neural networks, other computer-readable storage media (also referred to as processor-readable storage media), or the like, or any combination thereof. Memory 702 can be utilized to store information, including computer-readable instructions that are utilized by CPU 709 to perform actions, including those of embodiments described herein.

Memory 702 can have stored thereon enabling module(s) 705 that can be configured to implement and/or perform some or all of the functions of the systems, components and modules described. Memory 702 can also store other programs and data 707, which can include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, intelligence layer software, network functions (NF), artificial intelligence (AI) or machine learning (ML) programs or models to perform the functionality described herein, user interfaces, operating systems, other network management functions, other NFs, etc.

Network connections 715 are configured to communicate with other computing devices to facilitate the functionality described herein. In various embodiments, the network connections 715 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 711 can include video interfaces, other data input or output interfaces, or the like. Other computer-readable media 713 can include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

What is claimed is:

1. A method of dynamically allocating subscribers to different plans for cost minimization in a wireless network, comprising:

predicting, using a first machine learning model, daily data usage for a predetermined subsequent period for each of a plurality of subscribers of the wireless network;

constructing, using a second machine learning model, a plan grid and a cost grid for each of the plurality of subscribers based on their respective predicted daily data usage for the predetermined subsequent period, wherein the cost grid for each subscriber includes values indicating predicted costs for that subscriber for different time windows within the predetermined subsequent period;

allocating each subscriber to one of a first data plan and a second plan based on the plan grid;

reconstructing, using the second machine learning model running on a plurality of processing nodes, the plan grid and the cost grid for each of the plurality of subscribers based on actual data usage of each individual subscriber and total actual data usage of the plurality of subscribers on an immediately preceding day during each day of remaining days of the predetermined subsequent period;

loading the plan grid and the cost grid for each of the plurality of subscribers into a distributed shared memory (DSM);

reallocating one or more of the subscribers to a different data plan based on the reconstructed plan grids and the reconstructed cost grids during each day of the remaining days of the predetermined subsequent period;

distributing operations for optimizing allocation of subscribers to data plans across multiple processing nodes;

adding more processing nodes to the multiple processing nodes to which the operations for optimizing allocation of subscribers to data plans are distributed as more processing power is needed as a system for dynamically allocating subscribers to different plans scales; and providing increased memory resources to applications implementing the automatically reconstructing and automatically reallocating operations via the DSM as the system for dynamically allocating subscribers to different plans scales while facilitating memory resources spread across different machines.

2. The method of claim 1, wherein each of the time windows in the plan grid is a window of days, wherein the time windows cover each combination of days in the predetermined subsequent period.

3. The method of claim 1, wherein the first data plan is a metered plan, and the second data plan is a pooled plan, and both plans are wholesale plans.

4. The method of claim 1, wherein each cost grid contains one or more cost-reduction time windows, wherein each of the cost-reduction time window has a predicted cost for the subscriber if the subscriber stays in one of the first data plan and the second data plan.

5. The method of claim 4, wherein the reallocating of one or more of the subscribers to a different data plan based on the reconstructed plan grid and the reconstructed cost grid during each day of the remaining days of the predetermined subsequent period includes finding a best cost-reduction time window using a predetermined gradient descent algorithm.

6. The method of claim 1, wherein the first machine learning model is an N-beats.

7. The method of claim 6, wherein input parameters of the machine learning model includes one or more of: a subscriber's daily data usages in a past period of time, a retail plan of the subscriber, a geographic location of the subscriber, and payment information of the subscriber.

8. The method of claim 1, wherein the second machine learning model is one of a logistic regression model, a decision tree and random forests model, a gradient boosting model, a deep learning model and a reinforce learning model.

9. The method of claim 1, wherein the wireless network declare a plan allocation for each of the plurality of subscribers when that subscriber is initially allocated to one of the first data plan and the second data plan and declares a plan reallocation for each of the one or more subscribers.

10. A system for dynamically allocating subscribers to different plans for cost minimization in a wireless network, comprising:

one or more processors; and one or more memories coupled to the one or more processors and storing instructions, which, when executed by the one or more processors, cause the system to perform operations comprising:

predicting, using a first machine learning model, daily data usage for a predetermined subsequent period for each of a plurality of subscribers of the wireless network;

constructing, using a second machine learning model running on a plurality of processing nodes, a plan grid and a cost grid for each of the plurality of subscribers based on their respective predicted daily data usage for the predetermined subsequent period, wherein the cost grid for each subscriber includes values indicating predicted costs for that subscriber for different time windows within the predetermined subsequent period;

allocating each subscriber to one of a first data plan and a second plan based on the plan grid;

reconstructing, using the second machine learning model, the plan grid and the cost grid for each of the plurality of subscribers based on actual data usage of each individual subscriber and total actual data usage of the plurality of subscribers on an immediately preceding day during each day of remaining days of the predetermined subsequent period;

loading the plan grid and the cost grid for each of the plurality of subscribers into a distributed shared memory (DSM);

reallocating one or more of the subscribers to a different data plan based on the reconstructed plan grids and the reconstructed cost grids during each day of the remaining days of the predetermined subsequent period;

distributing operations for optimizing allocation of subscribers to data plans across multiple processing nodes;

adding more processing nodes to the multiple processing nodes to which the operations for optimizing allocation of subscribers to data plans are distributed as more processing power is needed as a system for dynamically allocating subscribers to different plans scales; and providing increased memory resources to applications implementing the automatically reconstructing and automatically reallocating operations via the DSM as the system for dynamically allocating subscribers to different plans scales while facilitating memory resources spread across different machines.

11. The system of claim 10, wherein each of the time windows in the plan grid is a window of days, wherein the time windows cover each combination of days in the predetermined subsequent period.

12. The system of claim 10, wherein the first data plan is a metered plan, and the second data plan is a pooled plan, and both plans are wholesale plans.

13. The system of claim 10, wherein each cost grid contains one or more cost-reduction time windows, wherein each of the cost-reduction time window has a predicted cost for the subscriber if the subscriber stays in one of the first data plan and the second data plan.

14. The system of claim 13, wherein the reallocating of one or more of the subscribers to a different data plan based on the reconstructed plan grid and the reconstructed cost grid during each day of the remaining days of the predetermined subsequent period includes finding the best cost-reduction time window using a predetermined gradient descent algorithm.

15. The system of claim 10, wherein input parameters of the machine learning model includes one or more of: a subscriber's daily data usages in a past period of time, a retail plan of the subscriber, a geographic location of the subscriber, and payment information of the subscriber.

16. The system of claim 10, wherein the first data plan is a metered plan, and the second data plan is a hybrid metered and pooled plan based on a tiered usage system.

17. The system of claim 10, wherein the first data plan is an individual subscriber metered plan and the second data plan is one of: a family plan that is based on pooled data usage for each individual subscriber that is part of the family plan and a plan for allocating one or more of the subscribers to a different data plan.

18. The system of claim 10, wherein the wireless network declares a plan allocation for each of the plurality of subscribers when that subscriber is initially allocated to one of the first data plan and the second data plan and declares a plan reallocation for each of the one or more subscribers.

19. A non-transitory computer readable medium storing instructions, which, when executed by one or more processors of a system for dynamically allocating subscribers to different plans for cost minimization in a wireless network, cause the system to perform operations comprising:

predicting, using a first machine learning model, daily data usage for a predetermined subsequent period for each of a plurality of subscribers of the wireless network;

constructing, using a second machine learning model running on a plurality of processing nodes, a plan grid and a cost grid for each of the plurality of subscribers based on their respective predicted daily data usage for the predetermined subsequent period, wherein the cost grid for each subscriber includes values indicating predicted costs for that subscriber for different time windows within the predetermined subsequent period;

allocating each subscriber to one of a first data plan and a second plan based on the plan grid;

reconstructing, using the second machine learning model, the plan grid and the cost grid for each of the plurality of subscribers based on actual data usage of each individual subscriber and total actual data usage of the plurality of subscribers on an immediately preceding day during each day of remaining days of the predetermined subsequent period;

loading the plan grid and the cost grid for each of the plurality of subscribers into a distributed shared memory (DSM);

reallocating one or more of the subscribers to a different data plan based on the reconstructed plan grids and the reconstructed cost grids during each day of the remaining days of the predetermined subsequent period;

distributing operations for optimizing allocation of subscribers to data plans across multiple processing nodes;

adding more processing nodes to the multiple processing nodes to which the operations for optimizing allocation of subscribers to data plans are distributed as more processing power is needed as a system for dynamically allocating subscribers to different plans scales; and providing increased memory resources to applications implementing the automatically reconstructing and automatically reallocating operations via the DSM as the system for dynamically allocating subscribers to different plans scales while facilitating memory resources spread across different machines.

20. The non-transitory computer readable medium of claim 19, wherein the first data plan is a metered plan, and the second data plan is a pooled plan, and both plans are wholesale plans.

* * * * *